under 35 U.S.C. 154(b) by 7 days.

(12) United States Patent
Gu (10) Patent No.: US 12,017,720 B1
(45) Date of Patent: Jun. 25, 2024

(54) BICYCLE WALL-MOUNTED FRAME

(71) Applicant: Haidong Gu, Pomona, CA (US)

(72) Inventor: Haidong Gu, Pomona, CA (US)

(73) Assignee: CYCLINGDEAL USA, INC., Montclair, CA (US)

( * ) Notice: Subject to any disclaimer, the term of this patent is extended or adjusted under 35 U.S.C. 154(b) by 7 days.

(21) Appl. No.: 18/096,528

(22) Filed: Jan. 12, 2023

(51) Int. Cl.
*B62H 3/12* (2006.01)
*B62H 3/10* (2006.01)

(52) U.S. Cl.
CPC ............... *B62H 3/12* (2013.01); *B62H 3/10* (2013.01)

(58) Field of Classification Search
CPC .... B62H 3/12; B62H 3/02; B62H 3/10; B60R 9/06; B60R 9/10; Y10S 224/924; B25H 3/04
See application file for complete search history.

(56) References Cited

U.S. PATENT DOCUMENTS

| | | | | |
|---|---|---|---|---|
| 1,670,204 A * | 5/1928 | Moore | ...................... | G09F 5/042 206/476 |
| 4,192,424 A * | 3/1980 | Allsop | ....................... | A47F 7/08 248/297.21 |
| 4,343,172 A * | 8/1982 | Nordlund | .................. | B25H 3/04 211/70.1 |
| 4,446,972 A * | 5/1984 | Sussman | ................ | A47G 29/08 211/60.1 |
| 4,488,327 A * | 12/1984 | Snider | ....................... | A46B 5/00 248/682 |
| 5,313,858 A * | 5/1994 | Stitt | ....................... | B01L 3/5082 81/3.27 |
| 5,447,241 A * | 9/1995 | Bureau | .................... | B62H 3/02 211/5 |
| 5,617,958 A * | 4/1997 | Laug | ........................ | B62H 3/12 211/24 |
| 6,641,099 B1 * | 11/2003 | Lue | .......................... | B25H 3/04 248/314 |
| 6,749,074 B1 * | 6/2004 | Hileman | ............... | A47F 7/0028 211/85.7 |
| 7,997,211 B2 * | 8/2011 | Peterson | ............ | F16M 11/2014 108/50.01 |
| 9,380,847 B1 * | 7/2016 | Killebrew | ................ | A45C 9/00 |
| D790,249 S * | 6/2017 | Park | .............................. | D6/540 |
| 11,044,991 B1 * | 6/2021 | Bryner | ................... | F16M 13/00 |
| 11,161,561 B1 * | 11/2021 | Gu | ........................... | B62H 3/12 |
| 11,761,576 B1 * | 9/2023 | Bryner | ................... | F16M 11/38 108/9 |
| 2005/0022699 A1 * | 2/2005 | Goza | ................. | A47B 21/0314 108/50.01 |
| 2006/0102569 A1 * | 5/2006 | Laga | ..................... | A47F 5/0807 211/70.6 |
| 2007/0295870 A1 * | 12/2007 | Peterson | ................ | F16M 13/02 248/125.7 |
| 2008/0251476 A1 * | 10/2008 | Shiao | ....................... | B25H 3/04 211/70.6 |
| 2016/0280296 A1 * | 9/2016 | Greenblatt | ............... | B62H 3/02 |
| 2016/0361960 A1 * | 12/2016 | Wright | .................... | B62H 3/12 |

\* cited by examiner

*Primary Examiner* — Ko H Chan (57) ABSTRACT

A bicycle wall-mounted frame includes a storage cabinet and a hanger. A long rod of the hanger can be telescopically moved relative to a sliding groove of the storage cabinet, so that support arms of the hanger can be moved toward or away from the storage cabinet, thereby adjusting a position of the hanger to prevent a hung bicycle from touching a wall.

7 Claims, 9 Drawing Sheets

BICYCLE WALL-MOUNTED FRAME

BACKGROUND OF THE INVENTION

1. Field of the Invention

The present invention is related to a wall-mounted frame, more particularly to a wall-mounted frame for users to hang bicycles by themselves.

2. Description of the Related Art

A bicycle is a common exercise machine nowadays, and it is also a convenient transportation device for short-distance commuting. The most common way to park a bicycle is to lean the bicycle against a wall in a corner of a garage or an indoor place. Due to the limited indoor space in the urban environment, the places where bicycles can be parked are limited; moreover, in order to avoid the parked bicycle from affecting the routes of people's walking and activities, a bicycle must be hung on the wall or hung on the ceiling.

China utility model patent CN21472961U and U.S. Ser. No. 10/099,738B2 disclose wall-mounted bicycle racks for hanging and positioning a bicycle frame and a seat of a bicycle, respectively.

However, bicycles come in a variety of styles, sizes and shapes, and not all bicycle are suitable for wall-mounted bicycle racks. In particular, because mountain bicycles and even downhill bicycles have handlebars with a relatively large size and the distance between the wall and the above-mentioned wall-mounted bicycle rack is fixed, when a length of the handlebar is greater than the distance between the aforementioned wall-mounted bicycle rack and the wall, there is a problem of insufficient applicability, and swinging the handlebar forcibly may also make the bicycle unable to hang in a balanced state, and it may cause a danger of easy falling off or cause the problem that a tire of the bicycle touches the wall to leave traces and make the wall unsightly.

SUMMARY OF THE INVENTION

An objective of the present invention is to disclose a bicycle wall-mounted frame, to solve the conventional problem.

In order to achieve the objective, the present invention discloses a bicycle wall-mounted frame including a storage cabinet and a hanger, wherein the storage cabinet has a sliding groove disposed on a bottom thereof and connected to a limitation groove, the hanger has a long rod, a base, and a pair of support arms, an end of the long rod is fastened with the base, the pair of the support arms is rotatably connected to the base, and other end of the long rod is movably inserted into the sliding groove, so that the base and the pair of the support arms are disposed outside the storage cabinet, wherein a locking member is inserted through the limitation groove to screw and lock with the long rod inside the sliding groove, when the long rod is moved along the sliding groove, the base and the pair of the support arms are moved towards or away from the storage cabinet at the same time, and the locking member is moved inside the limitation groove to limit the long rod from escaping from the sliding groove.

In practical use, the long rod of the hanger can be telescopically moved relative to the sliding groove, the support arms of the hanger can be moved toward or away from the storage cabinet, so that the hanger can be adjusted to prevent the bicycle from touching the wall; in addition, the pair of the support arms is rotatably connected to the base, so that the hanger can be adjusted appropriately and safely to hang and support the bicycle.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Figure 1:
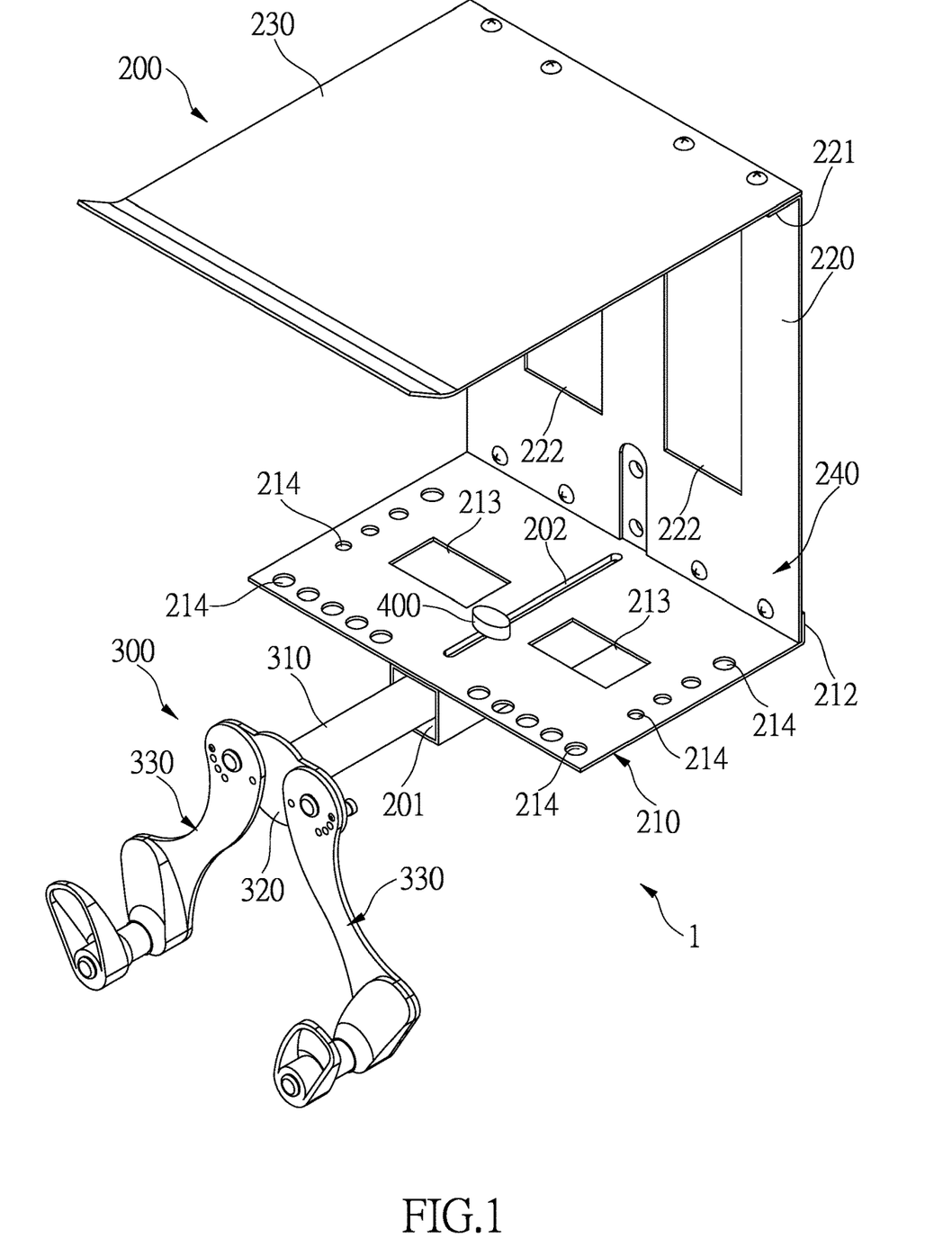
FIG. 1 is a perspective assembly view of a bicycle wall-mounted frame of the present invention.
Figure 2:
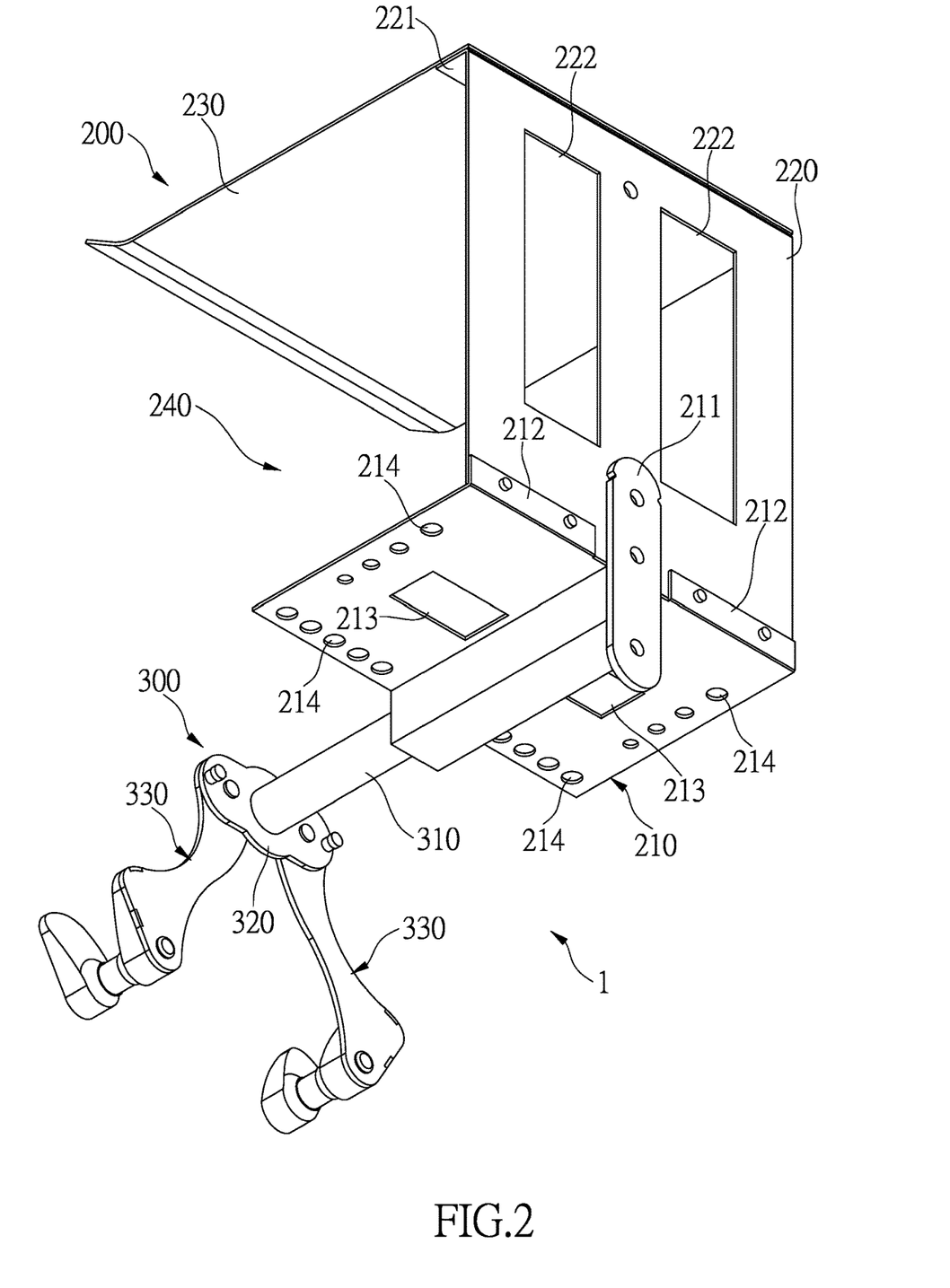
FIG. 2 is a perspective assembly view of a bicycle wall-mounted frame of the present invention, when viewed from another angle.

Please refer to FIG. 1 to FIG. 6. FIG. 1 shows a bicycle wall-mounted frame 1 including a storage cabinet 200 and a hanger 300. The storage cabinet 200 has a sliding groove 201 disposed on a bottom thereof and connected to a limitation groove 202, and the sliding groove 201 has an opening formed in a direction opposite to the wall. The hanger 300 has a long rod 310, a base 320, and a pair of support arms 330. An end of the long rod 310 is fastened with the base 320, the pair of the support arms 330 is rotatably connected to the base 320, other end of the long rod 310 is movably inserted into the sliding groove 201, so that the base 320 and the pair of the support arms 330 are disposed outside the storage cabinet 200. A locking member 400 is inserted through the limitation groove 202 to screw and lock with the long rod 310 inside the sliding groove 201. When the long rod 310 is moved along the sliding groove 201, the base 320 and the support arms 330 are moved towards or away from the storage cabinet 200 at the same time, and the locking member 400 is moved inside the limitation groove 202 to limit the long rod 310 from escaping from the sliding groove 201.

In practical use of the bicycle wall-mounted frame 1 of the present invention, the long rod 310 of the hanger 300 can be telescopically moved relative to the sliding groove 201, so that the support arms 330 of the hanger 300 are moved toward or away from the storage cabinet 200, to adjust a distance from the hanger 300 to the wall, thereby preventing the bicycle 500 from touching the wall; in addition, the pair of the support arms 330 is rotatably connected to the base 320, so that the hanger 300 can be adjusted appropriately and safely to hang and support the bicycle 500.

Features and assembly relationship of the members of the present invention will be illustrated in detail in the following paragraphs.

Figure 3:
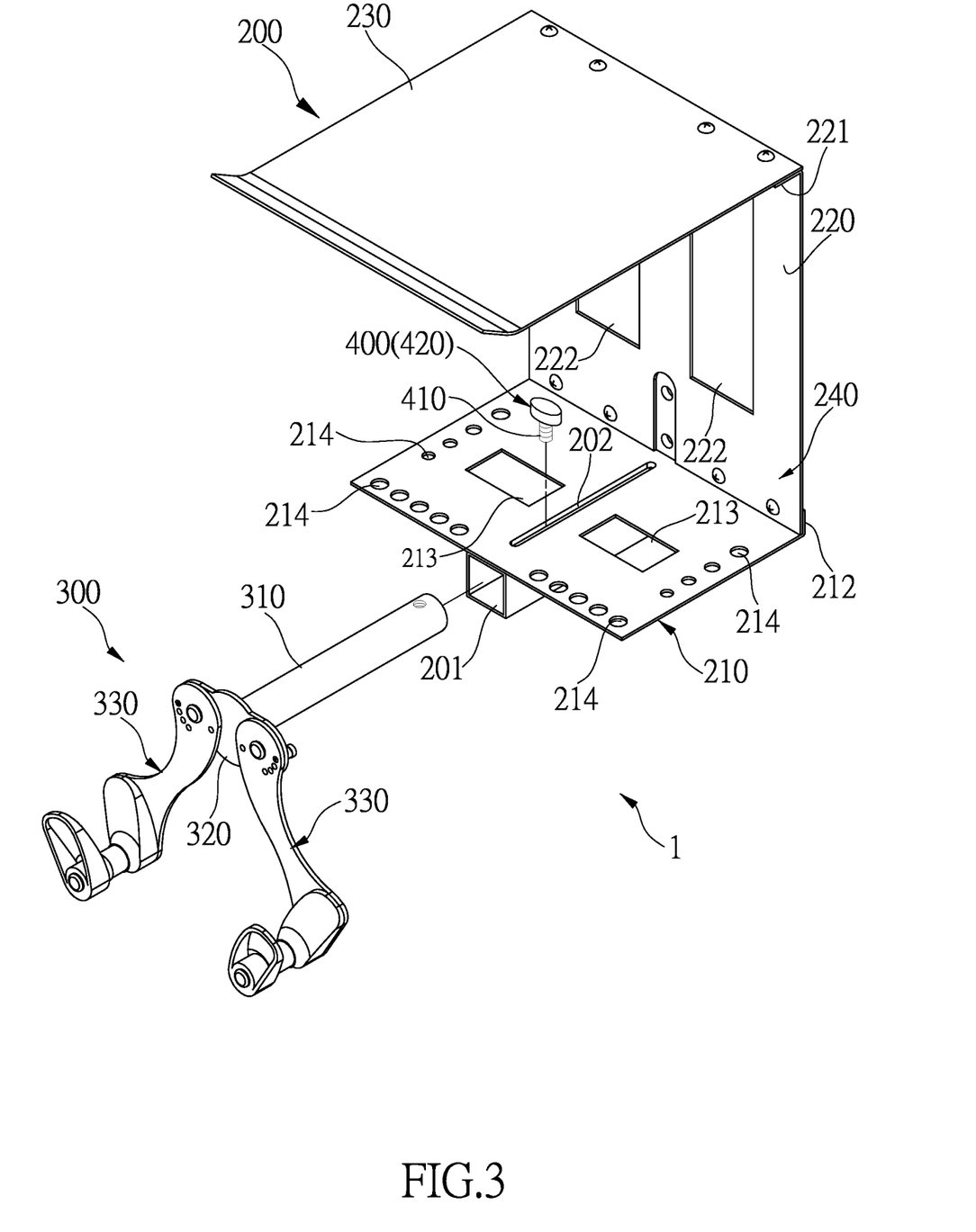
FIG. 3 is a perspective exploded view of a part of a bicycle wall-mounted frame, according to the present invention.
Figure 7:
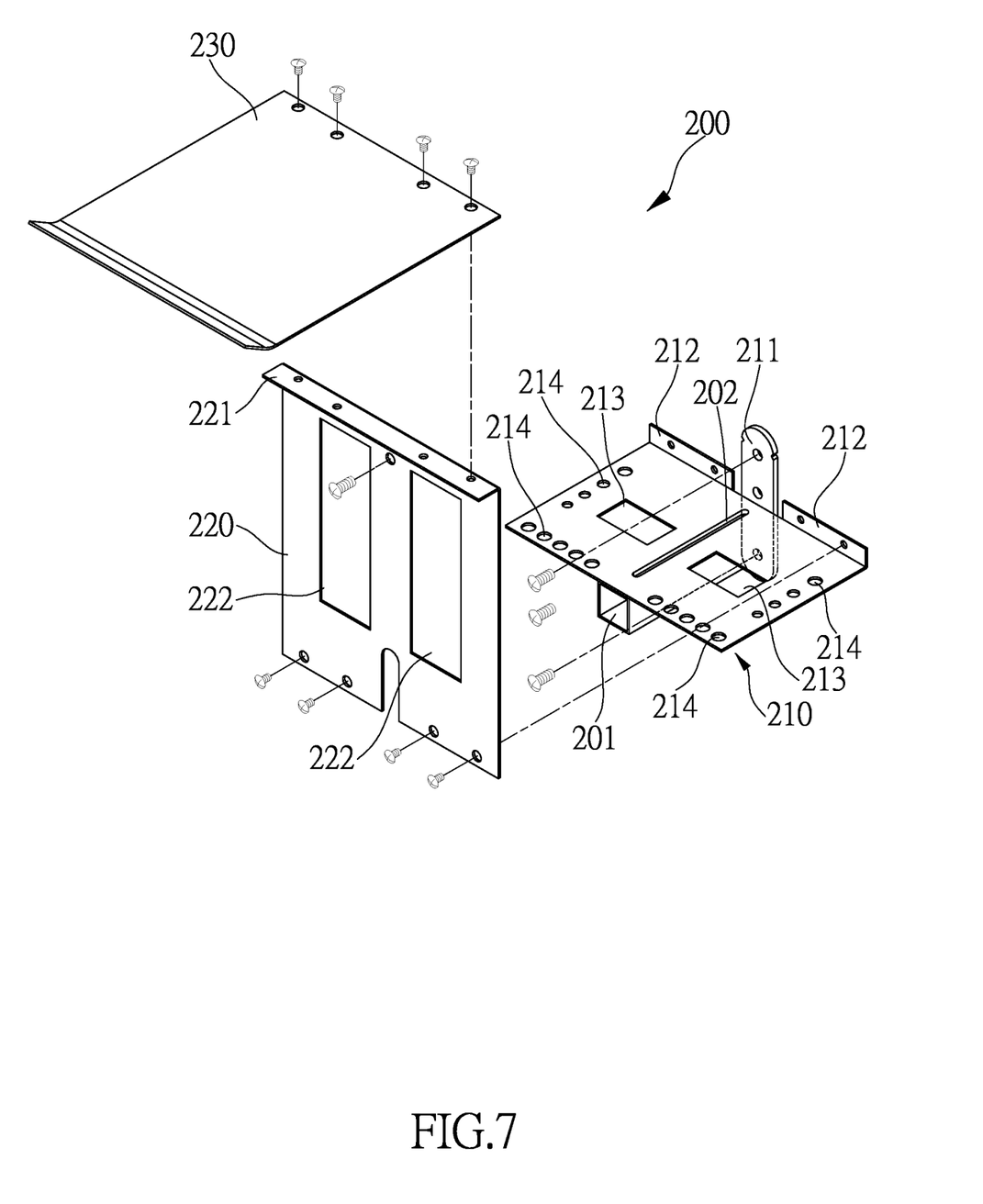
FIG. 7 is a perspective exploded view of a storage cabinet of the present invention.

In this embodiment, the storage cabinet 200 has a bottom plate 210, a back plate 220, and a top plate 230; the bottom plate 210, the back plate 220 and the top plate 230 form a storage space 240, and the storage space 240 has a multi-directional opening facing three side directions other than a side direction toward the back plate 220, as shown in FIG. 3 and FIG. 7. The above-mentioned structure forming a multi-directional opening allows a user to fetch articles placed in the storage space 240 conveniently.

The sliding groove 201 is formed and surrounded by a frame-shaped member and located at a lower side of the bottom plate 210, and the limitation groove 202 passes through the bottom plate 210 and the sliding groove 201 to form a communication state.

Figure 4:
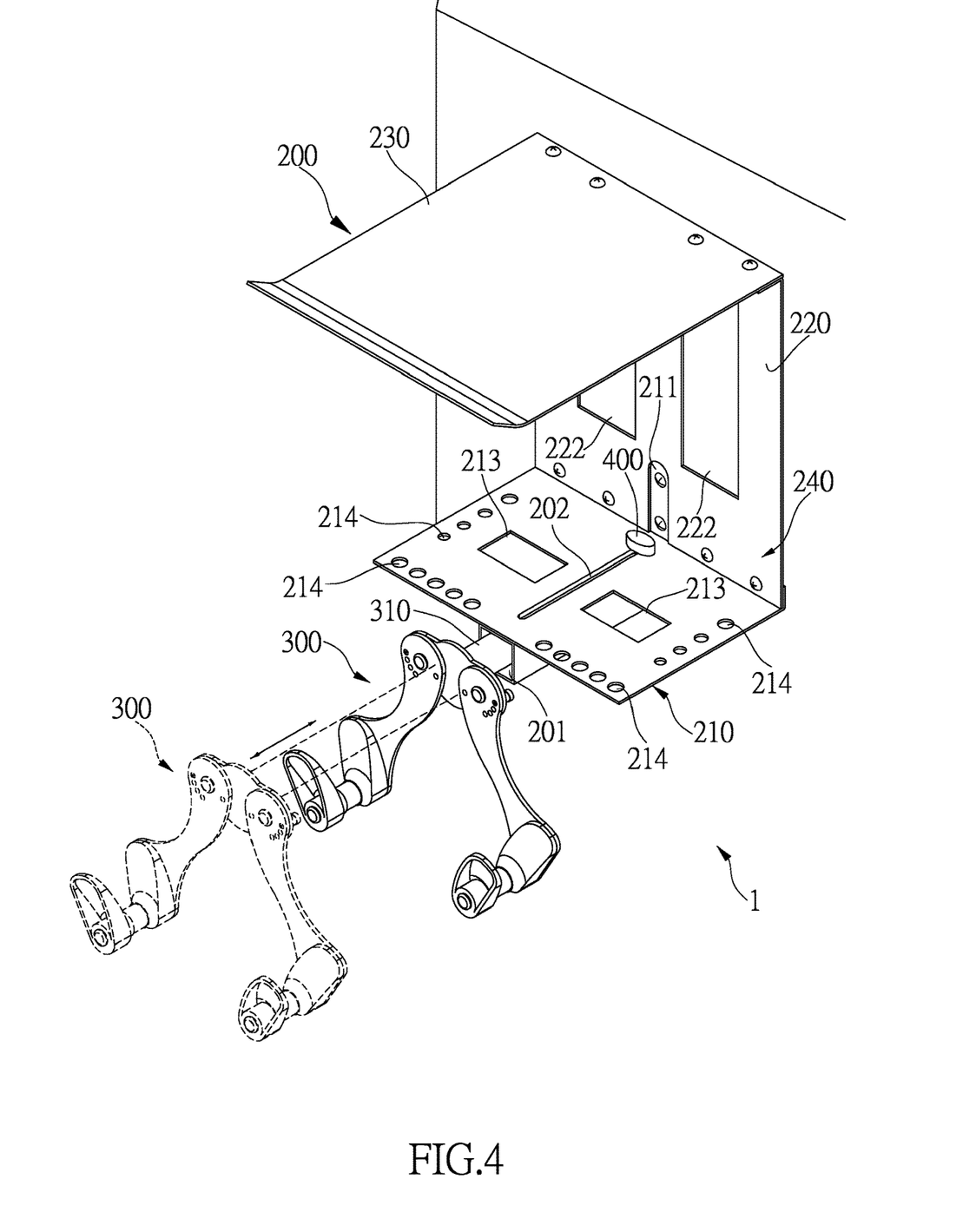
FIG. 4 is a perspective view showing an operation of telescopically adjusting a hanger relative to a storage cabinet, according to the present invention.
Figure 5:
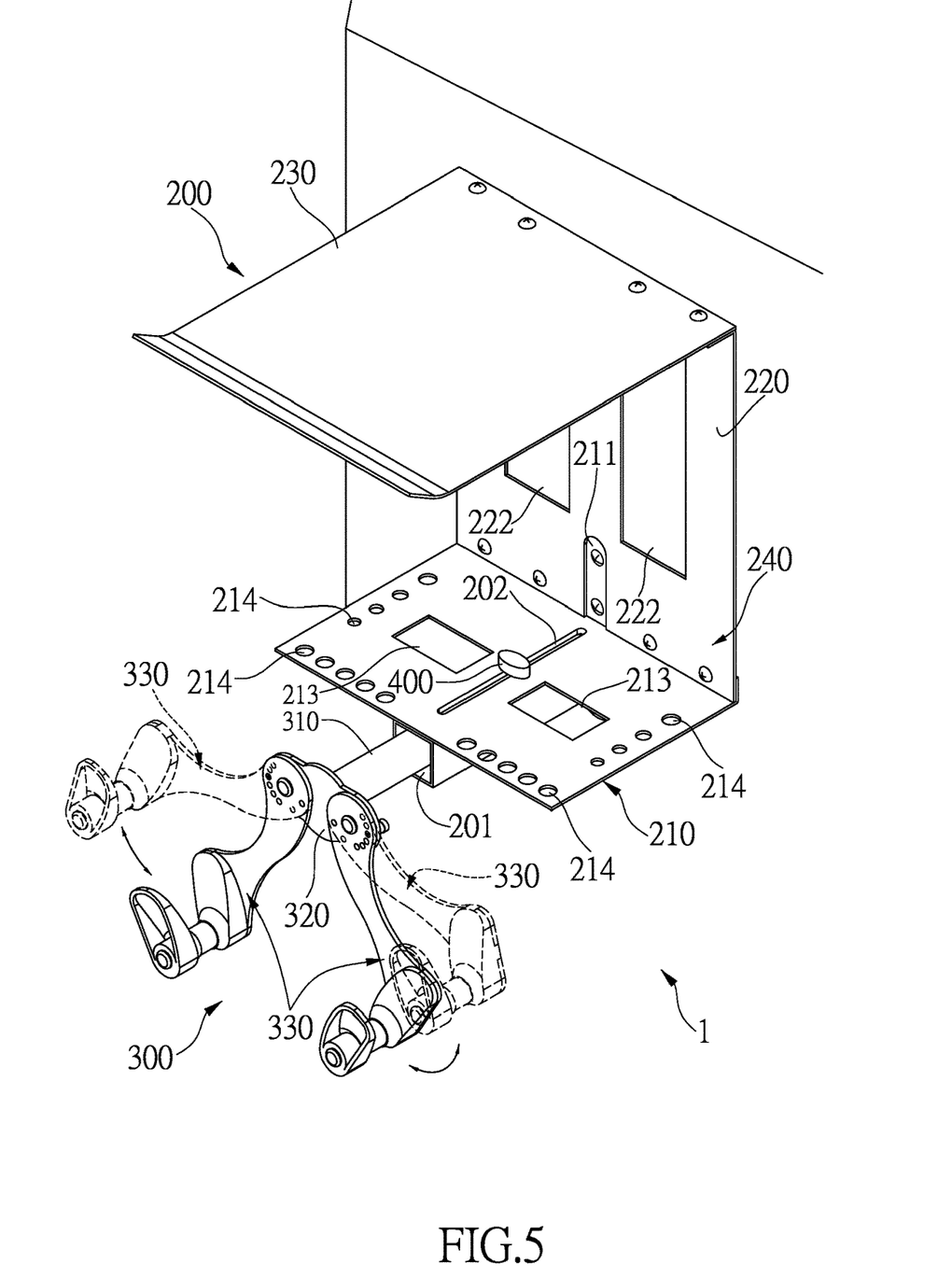
FIG. 5 is a perspective view showing an operation of swing and adjusting support arms, according to the present invention.

In this embodiment, the bottom plate 210 has a fastening part 211 disposed on a circumferential side thereof and extended upwardly and downwardly; the fastening part 211 is abutted with the wall, and screws are inserted into the fastening part 211 to fasten the fastening part 211 on the wall, as shown in FIG. 3, FIG. 4, and FIG. 7. As a result, mounting the fastening part 211 on the wall at position above and below the bottom plate 210 is able to disperse the load-bearing force.

In this embodiment, the bottom plate 210 has a connection part 212 disposed on a circumferential side thereof and extended upwardly, the connection part 212 is overlapped with a lower end of the back plate 220, and screws are inserted into the overlapped portions of the connection part 212 and the lower end of the back plate 220, as shown in FIG. 3 and FIG. 7. The connection part 212 is disposed on the same side as the fastening part 211, adjacent to and spaced apart from the fastening part 211; as a result, the above-mentioned structure is able to enhance the structural strength of combination.

In addition, a lower end of the back plate 220 is abutted against an upper surface of the bottom plate 210, and the upper end of the back plate 220 is fixed on the wall by a screw.

In this embodiment, the back plate 220 has a protruding part 221 disposed on an upper side thereof and extended outwardly, the protruding part 221 is overlapped with an end of the top plate 230, and screws are inserted into the overlapped portions of the protruding part 221 and the end of the top plate 230, as shown in FIG. 3 and FIG. 7. The above-mentioned structure is able to enhance the structural strength of combination.

Figure 8:
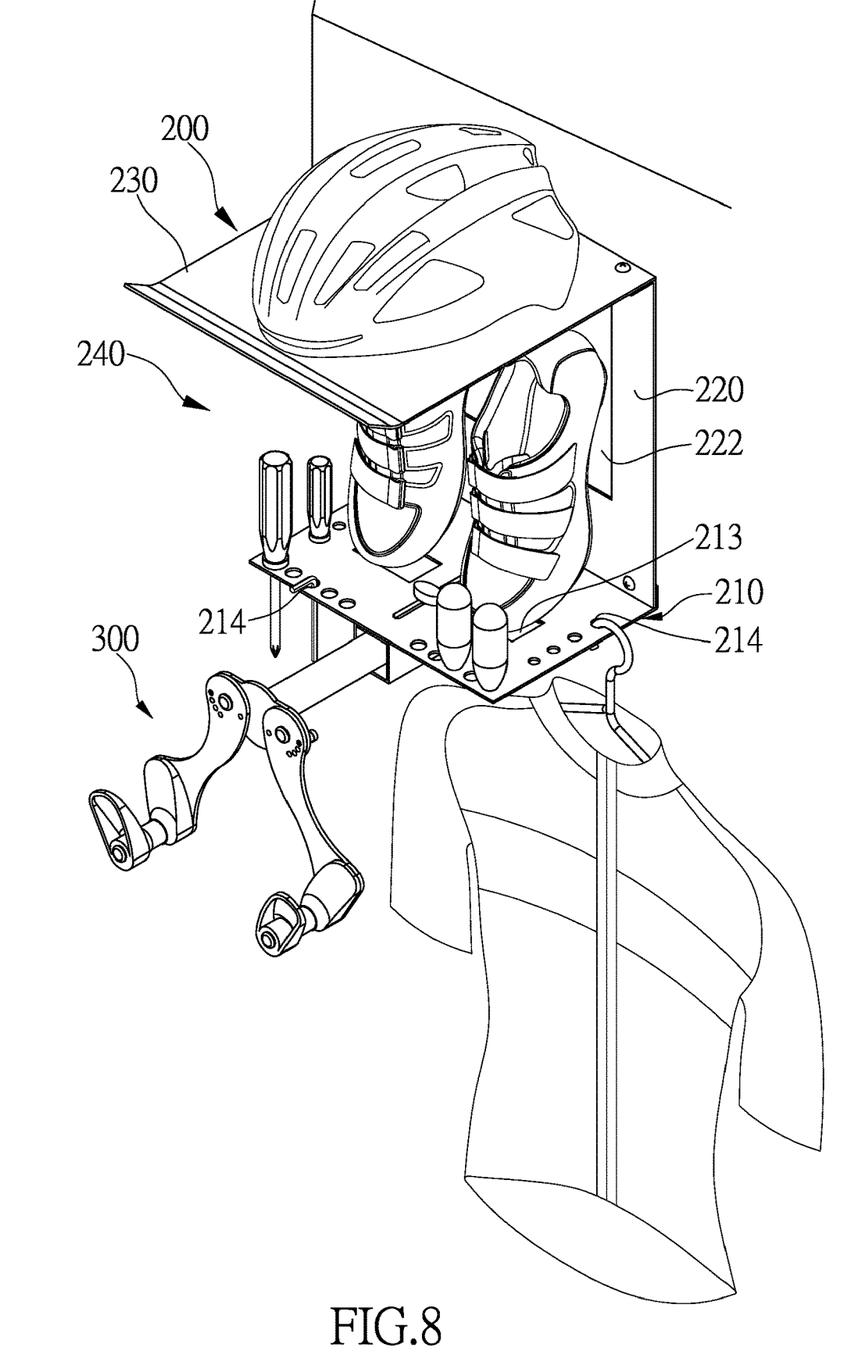
FIG. 8 is a schematic diagram of a bicycle wall-mounted frame where a bicycle shoe, a hex key, a screwdriver, a $CO_2$ bottle, a hanger and a helmet are placed, according to the present invention.

In this embodiment, the bottom plate 210 has a through hole 213 disposed thereon, and the back plate 220 has a through hole 222 disposed thereon, the through hole 213 and the through hole 222 are configured to place and position a bicycle shoe obliquely, as shown in FIG. 8. A bicycle shoe can be placed obliquely in the above-mentioned structure without occupying much horizontal space, so that another articles can be placed in the storage space 240 and the multi-directional opening is helpful for air circulation to dissipate the peculiar smell in the bicycle shoe.

In this embodiment, the bottom plate 210 has an accessory hole 214 disposed on an edge near the circumferential side thereof. The accessory hole 214 can be used to movably insert or hang a hex key, a screwdriver, a $CO_2$ bottle, a hanger, as shown in FIG. 8, so that a user can place belongings or wearing item for bicycle riding, or repair/maintenance tools on the bicycle wall-mounted frame of the present invention.

In this embodiment, the top plate 230 is substantially a continuous flat surface, and a periphery of an end of the top plate 230 that is opposite to another end of the top plate 230 connected to the back plate 220 is in a tilt-up shape. With the top plate 230 being continuous flat surface, a helmet can be smoothly placed on the top plate 230, and the tile-up shape can avoid the helmet from escaping to outside, so as to prevent the helmet from falling off when the user places or fetches the helmet, as shown in FIG. 8.

In this embodiment, the locking member 400 includes a screw rod 410, and a knob 420 connected to the screw rod 410. The screw rod 410 is inserted into the limitation groove 202 to screw with a circumferential side of the long rod 310. The knob 420 is disposed in the storage space 240, so that the user can rotate the knob 420 to operate the locking member 400, so as to complete switching between a fastening state and a movable state of the locking member 400 relative to the long rod 310. The fastening state means that the long rod 310 is unable to move in the sliding groove 201, the knob 420 is abutted against an upper surface (an outer edge of an opening of the limitation groove 202) of the bottom plate 210. The above-mentioned movable state means that the long rod 310 can be moved in the sliding groove 201.

Figure 6:
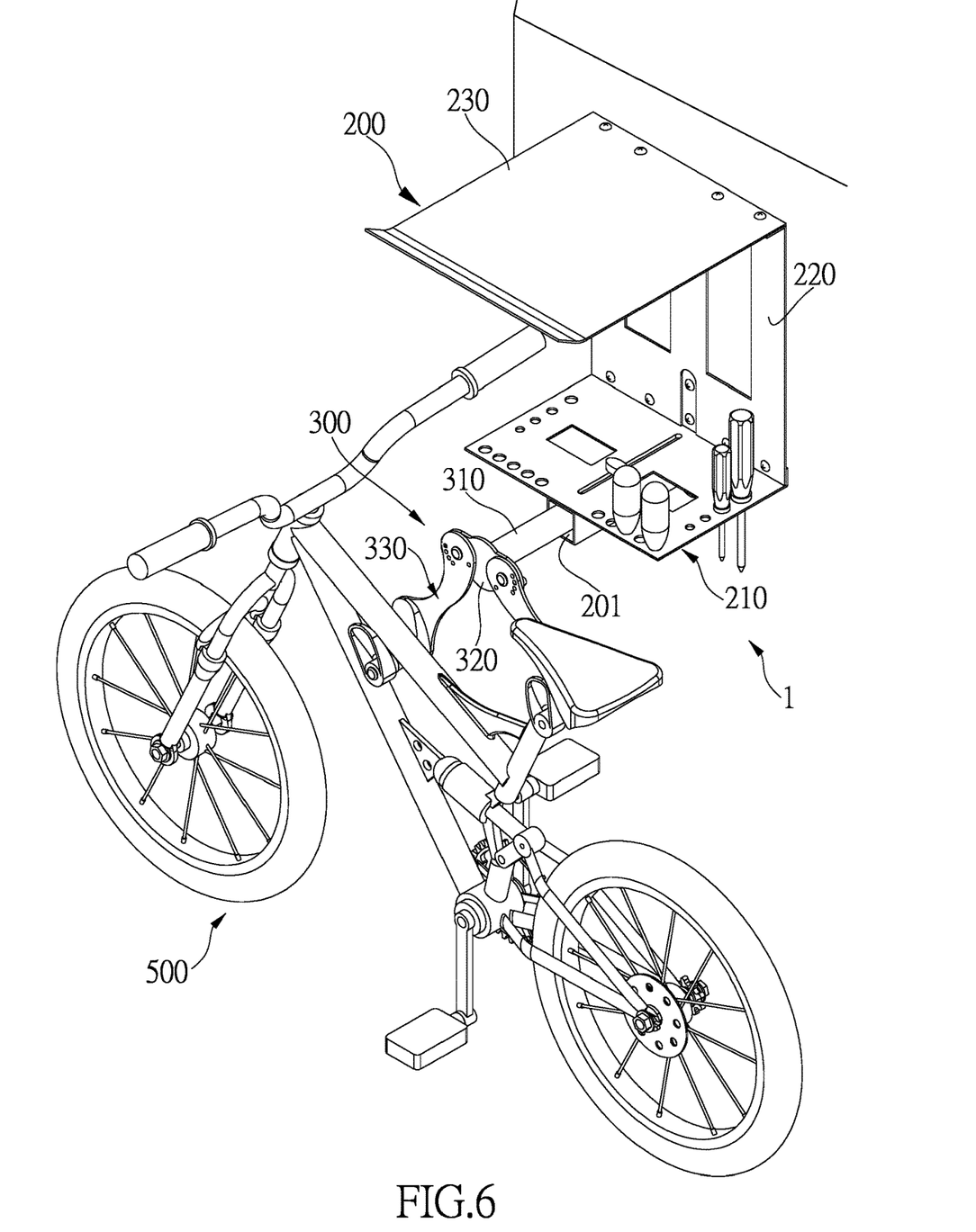
FIG. 6 is a perspective view of a bicycle hung on a bicycle wall-mounted frame of the present invention.
Figure 9:
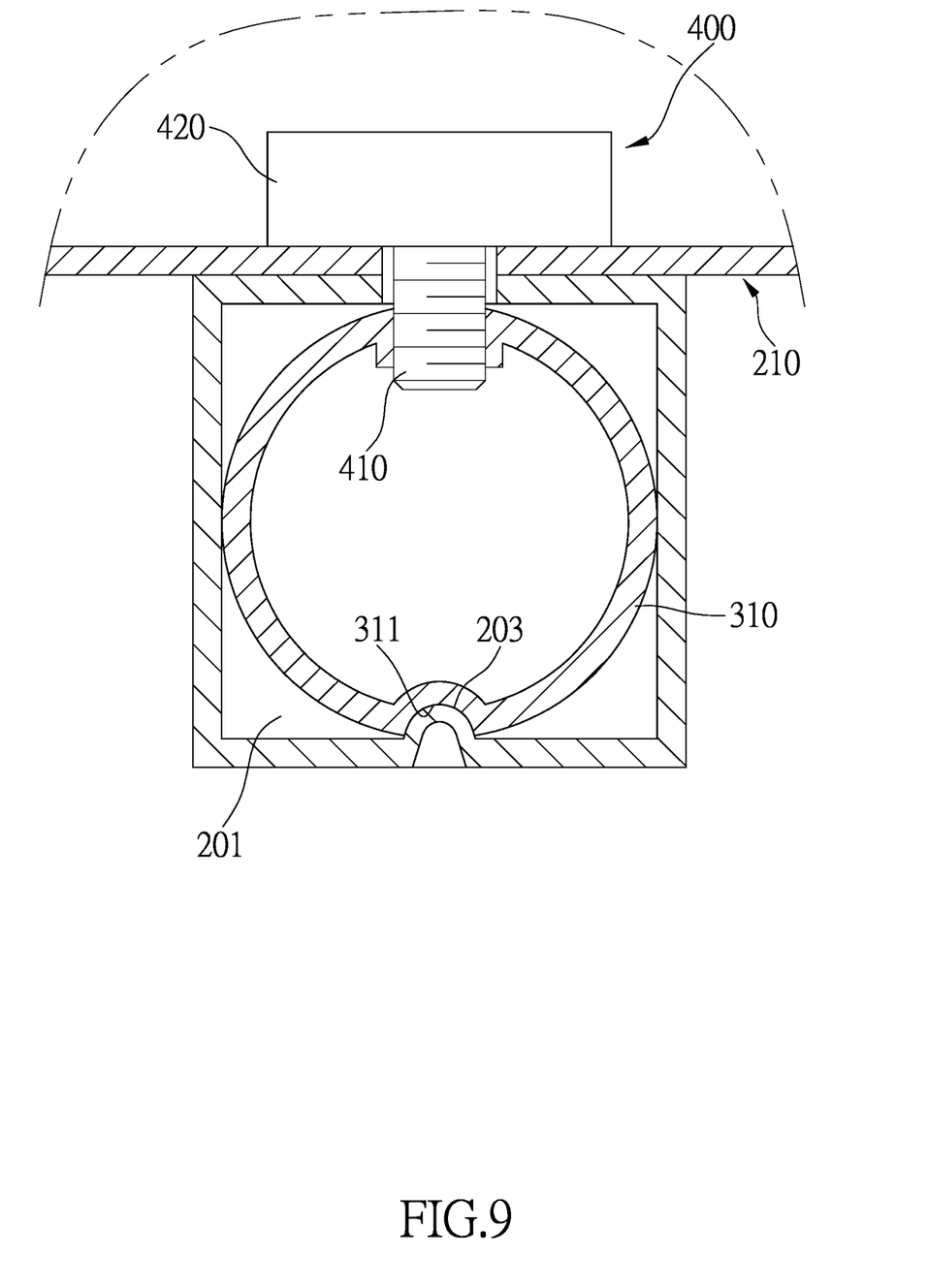
FIG. 9 is a schematic inner-radial cross-sectional view of a long rod staying inside a sliding groove, according to the present invention.

Please refer to FIG. 6 and FIG. 9. The long rod 310 has a concave part 311 disposed on an outer periphery thereof, and the sliding groove 201 has a convex part 203 for engaging with the concave part 311. With engagement between the convex part 203 and the concave part 311, the long rod 310 can be prevented from swing relative to the sliding groove 201 when the long rod 310 is telescopically moved in the sliding groove 201 or the bicycle 500 is hung on the hanger 300, so as to provide the effect of stabilizing the hanger 300 and dispersing the lateral force applied on the locking member 400 when the bicycle 500 is hung on the hanger 300.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A bicycle wall-mounted frame, comprising a storage cabinet and a hanger, wherein the storage cabinet has a sliding groove disposed on a bottom thereof and connected to a limitation groove, the hanger has a long rod, a base, and a pair of support arms, an end of the long rod is fastened with the base, the pair of the support arms is rotatably connected to the base, and other end of the long rod is movably inserted into the sliding groove, so that the base and the pair of the support arms is disposed outside the storage cabinet;

wherein a locking member is inserted through the limitation groove to screw and lock with the long rod inside the sliding groove, when the long rod is moved along the sliding groove, the base and the pair of the support arms are moved towards or away from the storage cabinet at the same time, and the locking member is moved inside the limitation groove to limit the long rod from escaping from the sliding groove;

wherein the storage cabinet has a bottom plate, a back plate and a top plate, wherein the bottom plate, the back plate and the top plate form a storage space, and the storage space has a multi-directional opening facing three side directions other than a side direction toward the back plate;

wherein the bottom plate has a connection part disposed on a circumferential side thereof and extended upwardly the connection part is overlapped with a lower end of the back plate, and screws are inserted into the overlapped portions of the connection part and the lower end of the back plate.

2. The bicycle wall-mounted frame according to claim 1, wherein the bottom plate has a fastening part disposed on a circumferential side thereof and extended upwardly and downwardly, and the fastening part is abutted with a wall, and screws are inserted into the fastening part to lock on the wall.

3. The bicycle wall-mounted frame according to claim 1, wherein the back plate has a protruding part disposed on an upper side thereof and extended outwardly, the protruding part is overlapped with an end of the top plate, and screws are inserted into the overlapped portions of the protruding part and the end of the top plate.

4. The bicycle wall-mounted frame according to claim 1, wherein the bottom plate has a first through hole disposed thereon, and the back plate has a second through hole disposed thereon, the first through hole and the second through hole are configured to place and position a bicycle shoe obliquely.

5. The bicycle wall-mounted frame according to claim 1, wherein the bottom plate has an accessory hole disposed on a circumferential side edge thereof.

6. The bicycle wall-mounted frame according to claim 1, wherein the top plate is substantially a continuous flat surface, and a periphery of an end of the top plate that is opposite to another end of the top plate connected to the back plate is in a tilt-up shape.

7. The bicycle wall-mounted frame according to claim 1, wherein the locking member comprises a screw rod, and a knob connected to the screw rod, wherein the screw rod is inserted into the limitation groove to screw with a circumferential side of the long rod.

* * * * *